No. 848,109. PATENTED MAR. 26, 1907.
G. F. LEIGER.
SPEED REGULATING MECHANISM.
APPLICATION FILED SEPT. 13, 1906.
2 SHEETS—SHEET 1.
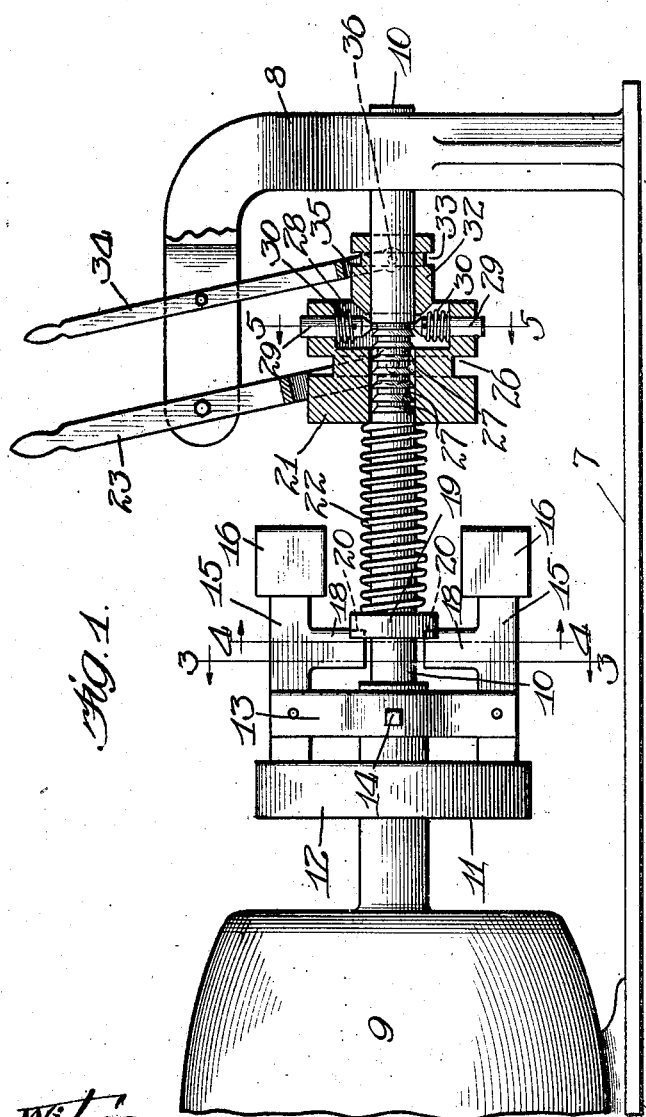
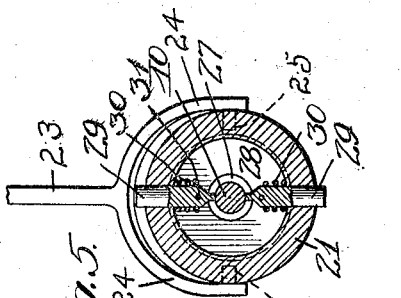
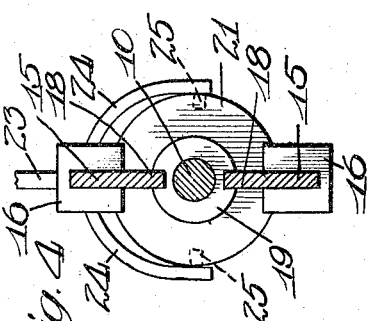
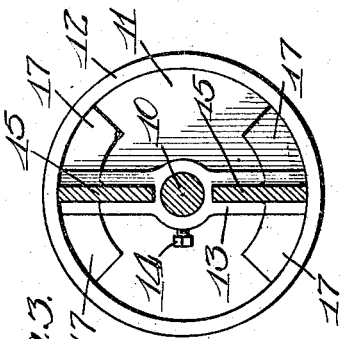
Witnesses:
Inventor:
George F. Leiger

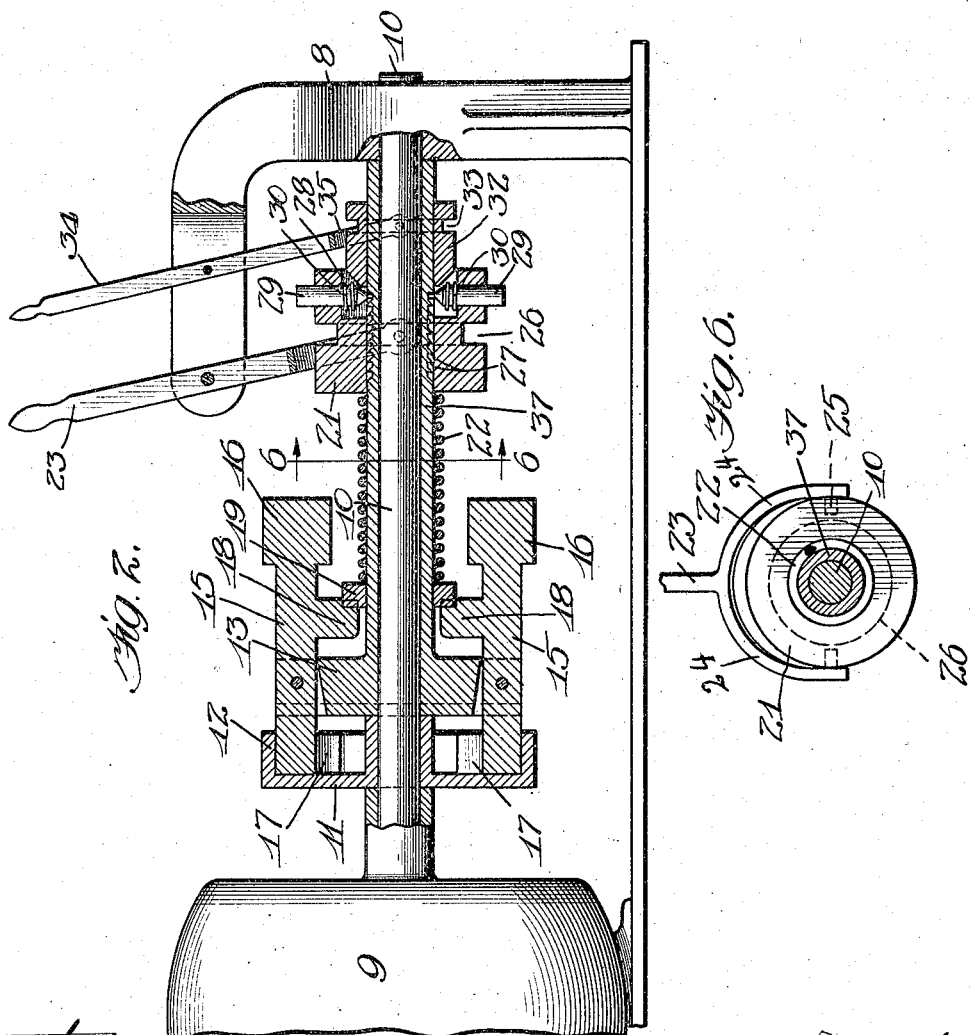

UNITED STATES PATENT OFFICE.

GEORGE F. LEIGER, OF OAK PARK, ILLINOIS.

SPEED-REGULATING MECHANISM.

No. 848,109.

Specification of Letters Patent.

Patented March 26, 1907.

Application filed September 13, 1906. Serial No. 334,503.

*To all whom it may concern:*

Be it known that I, GEORGE F. LEIGER, a citizen of the United States, residing at Oak Park, in the county of Cook, State of Illinois, have invented certain new and useful Improvements in Speed-Regulating Mechanism, of which the following is a specification, reference being had to the accompanying drawings.

My invention relates to speed-regulating mechanism for shafts and similarly rotating members; and its object is to provide a means by which the rotating speed of a driven member may be regulated.

More particularly its object is to provide mechanism by means of which the speed of rotation of a rotating member when it once attains a given speed of rotation may be automatically maintained at and prevented from exceeding that predetermined speed, regardless of the temporary excesses in speed of the driving member or mechanism, and to provide mechanism by means of which the mechanism may be readily and conveniently regulated to adjust it to any predetermined speed without stopping the machine, whereby the speed of the driven member may be varied while in operation, so that it may be caused to run slower or faster, as may be desired.

To that end my invention consists of a pulley or similar revoluble member, which may be either a driving or a driven pulley, a shaft upon which said pulley is loosely mounted, clutch members provided with spring or similarly-operating means adapted to effect engagement between the shaft and pulley, centrifugally-operated means adapted to throw the clutch members out of engagement when a predetermined speed of rotation is reached, and mechanism by means of which without stopping the machine the tension of the springs may be varied in accordance with the predetermined speed of rotation at which it is desired that the disengagement may be effected and mechanism by means of which the tension on the springs may be locked at any desired point while the machine is in motion, whereby without stopping the driven member its speed may be varied to run slower or faster, as may be desired.

My mechanism is peculiarly adapted to the operation of electrical generators driven by gasolene-engines, especially such as are used for sparkers, for instance, in automobiles and similar machines, and to other generators intended to be driven by gasolene-engines whose speed often temporarily exceeds the speed at which the generator is desired and adapted to be run; but it may, of course, be used in any mechanism in which it is desirable that the speed of the driven shaft should be automatically prevented from exceeding a predetermined rate of revolution. For instance, my mechanism may be used upon drills, lathes, or similar machines in which it is desired not only to maintain a predetermined speed, but in which the speed at which the machine is run may be varied to run slower or faster during its operation and without the stopping of the machine.

I accomplish these objects by the means illustrated in the drawings and hereinafter described.

That which I believe to be new will be pointed out in the claims.

In the drawings, Figure 1 is a side elevation, partly in vertical section. Fig. 2 is a side elevation, partly in vertical section and showing a slightly-modified form of my mechanism. Fig. 3 is a cross-section on line 3 3 of Fig. 1. Fig. 4 is a section on line 4 4 of Fig. 1. Fig. 5 is a cross-section on line 5 5 of Fig. 1. Fig. 6 is a section on line 6 6 of Fig. 2.

Referring to the drawings, 7 indicates the body-plate of the machine, and 8 indicates a standard mounted thereon.

9 indicates conventionally an electrical generator which my mechanism may be used to drive and shown in that form for purposes of convenience.

10 indicates a shaft by which the generator 9 is driven and is journaled in the upper end of the standard 8.

11 indicates a loose pulley which is mounted on the shaft 10 and is provided with a circumferential flange 12. (Best shown in Figs. 2 and 3.) The inner surface of the flange 12 is adapted to form a bearing for the friction-clutch bearings hereinafter described.

13 indicates a yoke which is secured to shaft 10 by a set-screw 14 or in any other appropriate manner.

15 indicates levers which are pivotally supported in suitable slots in the ends of the yoke 13 and carry upon their outer ends weights 16. Upon their inner ends the levers 15 are provided with clutch-bearings 17, which are provided with curved outer surfaces concentric with the inner surface of the flange 12 and are adapted to engage therewith, as hereinafter described.

18 indicates arms on the levers 15, which project inward toward the shaft 10 in the lines of the radii of the pulley 11.

19 indicates a collar slidingly mounted on the shaft 10, so as to bear upon the arms 18 of the levers 15, and preferably is provided with notches 20, so as to cause it to engage said arms and rotate with the shaft 10.

21 indicates a collar which is slidingly mounted and preferably feathered upon the shaft 10, so as to slide thereon, but rotate therewith.

22 indicates a coiled expansion-spring which is mounted on the shaft 10 and bears at its ends, respectively, against the collars 19 and 21. The spring 22 when the collar 21 is held in any given position in the manner hereinafter described operates to force the collar 19 against the arms 18 of the levers 15, and thus throw the inner ends of said levers outward, bringing the clutch-bearings 17 into engagement with the interior surface of the flange 12, whereby when said pulley 11 is driven the shaft 10 will be driven with it.

23 indicates a lever pivoted upon the standard 8 and provided at its lower ends with a fork 24. The fork 24 is provided at its lower ends with engaging pins 25, which engage a circumferential groove 26 in the collar 21. By rocking the lever 23 it will be obvious the collar 21 may be moved toward or away from the collar 19, so as to vary the pressure of the spring between the two collars.

27 indicates circumferential ratchet-shaped shoulders which are cut upon the shaft 10.

28 indicates a chamber in the rear end of the collar 21.

29 indicates pins which are supported in the collar 21 and project inwardly into the chamber 28, so as to engage the ratchet-shoulders 27.

30 indicates coiled springs which bear against the inner surface of the chamber 28 and pins 29 and operate to normally force the pins 29 toward the shaft 10. The inner ends of the pins 29 are beveled into the shape of a cone.

32 indicates a collar which is slidingly mounted upon the shaft 10 and preferably feathered on said shaft, so as to slide thereon, but rotate therewith, and is provided with a circumferential groove 33. The inner end of the collar 32 is beveled, as is best shown in Fig. 1, so that when the collar 32 is slid inward, as hereinafter described, the beveled end, bearing upon the conical ends of the pins 29, will force them upward and outward out of engagement with the ratchet-shoulders 27.

34 indicates a lever pivoted on the standard 8 and provided with a fork 35 at its lower end, which, by means of pins 36, engages with the groove 33 in the collar 32. By the swinging of the lever 34 the collar 32 may be slid upon the shaft 10 in one direction or the other, so as to force the pins out of engagement with the ratchet-shoulders or permit them to engage the same.

The operation of the devices above described is as follows: The tension of the spring 22 being adjusted in proper relation to the weights 16 by the moving of the lever 23 to any desired position, where it is held by means of the pins 29, the clutch-bearings 17 are held in engagement with the inner surface of the flange 12 by the pressure of the spring. The pulley 11 being driven from any suitable source of power, (not shown,) the shaft 10 will be rotated. The rotation of course will tend by centrifugal force to throw the weights 16 outward and to effect a disengagement of the clutch members, and this tendency of course will increase as the speed of rotation increases. When the given predetermined speed is reached, the centrifugal force of the weights 16 will overcome the tension of the spring and the disengagement will be effected between the clutch members and the pulley, preventing the shaft 10 from exceeding the predetermined speed of rotation. To adjust the tension of the spring to the centrifugal force of the weights or to vary the predetermined speed at which the centrifugal force will overcome the tension of the spring, the levers 23 and 34 are swung. In case it is desired to increase the tension of the spring the lever 23 is moved so as to force the collar 21 inward until the desired tension is reached, the pins moving over the ratchet-shoulders 27 as the collar moves inward until the proper location is reached. If it is desired to loosen the tension of the spring, the lever 34 is swung, so as to move the collar 32 inward until its beveled end, operating upon the conical ends of the pins, raises them from engagement with the ratchet-shoulders 27, when the tension of the spring will force the collar 21 backward until the desired point is reached, at which point, the lever 34 being swung to disengage the collar 32 from the pins 29, they again engage the ratchet-shoulders. It will be obvious also from the above description that this mechanism may be operated without the stopping of the machine to change the speed of the driven member to make it run either slower or faster. If, for instance, the machine is set to a predetermined speed in the manner above described, and if it is desired to increase that speed for any reason by the operation of the lever 23, the collar 21 may be forced inward, while the machine is still rotating, to any desired position, the pins 29 operating to automatically lock the collar in place in any desired position. On the other hand, in case the machine is running at a predetermined speed and it is desired to slow down that speed without stopping the machine it will be obvious that a reverse movement of the levers may be made, relaxing the tension upon the spring, the collar 21 being locked, as above described, automatically at any desired position.

Figs. 2 and 6 represent a modification of my mechanism which is used when it is not desired to cut the notches directly upon the shaft 10. In this figure, 8 represents the standard, 9 the conventionally-illustrated generator which may be driven by my mechanism, and 10 the driving-shaft journaled at its outer end in the standard 8. 11 represents the loose pulley on the shaft 10, provided with the flange 12. In this case, 37 indicates a sleeve which is mounted upon and keyed or otherwise secured to the shaft 10. 13 indicates the yoke, which instead of being keyed to the shaft 10, as in Fig. 1, is preferably formed upon or may be in any suitable manner secured to the sleeve 37 and carries the arms 15, provided with weights 16 upon their outer ends and clutch-bearings 17, all like and operating in the same manner as described with reference to Fig. 1. The collar 19 is feathered or otherwise slidingly mounted upon the sleeve 37, so as to rotate therewith, and engages the arms 18 of the levers 15, as already above described. The collar 21 in the mechanism shown in this figure is mounted upon the sleeve 37 instead of upon the shaft 10, as is shown in Fig. 1, and is preferably keyed thereto, so as to rotate therewith. The circumferential ratchet-shoulders 27 are cut in the sleeve 37 instead of upon the shaft 10, and all the other parts in the construction shown in this figure and numbered by the same reference-numerals as the same parts bear in Fig. 1 are constructed in the same manner and operate in the same way as already described, except that they are carried upon the sleeve 37 instead of upon the shaft 10, as is shown in Fig. 1. The advantage of this construction lies in the fact that the shaft does not have to be cut, and the mechanism may be mounted upon shafting already in existence without any cutting of the shafting.

For convenience of description and illustration I have shown the pulley 11 as being a driving-pulley and the shaft 10 as being driven thereby. It is of course perfectly obvious that without changing the mechanism or its operation the shaft 10 might be driven by any prime mover or suitable source of power and the pulley 11 be driven thereby and connected with any mechanism that it was desired to operate in any suitable manner, and I therefore do not, of course, confine myself to a construction in which the pulley is the driving and the shaft the driven member, as my invention applies equally as well without changing the construction or operation to either form of construction or mode of operation.

What I claim as my invention, and desire to secure by Letters Patent, is—

1. The combination with a shaft, a loose pulley mounted thereon, a clutch member, a spring bearing on said clutch member and adapted to normally effect an engagement by means of said clutch member between said pulley and said shaft, and centrifugally-operated means adapted to effect a disengagement between said clutch member and said pulley and shaft when a predetermined speed of rotation is reached, of means adapted to be operated while the machine is running to vary the tension of the spring, and means adapted to automatically lock the tension of said spring at any desired point.

2. The combination with a shaft, a loose pulley mounted thereon, clutch members carried by said shaft and adapted to engage said pulley, a spring bearing on said clutch members and adapted to normally hold said clutch members in engagement with said pulley, and centrifugally-operated means adapted to automatically disengage said clutch members from said pulley when a predetermined speed of rotation is reached, of means adapted to be operated while the machine is running to vary the tension of the spring, and means adapted to automatically lock the tension of said spring at any desired point.

3. The combination with a shaft, a loose pulley mounted on said shaft, a support carried by said shaft and rotatable therewith, levers mounted on said support, clutch-bearings on said levers adapted to engage said pulley, a spring bearing on said levers and adapted to normally hold said clutch-bearings in engagement with said pulley, and weights carried on said levers and tending to throw said clutch-bearings out of engagement by centrifugal force when said shaft is rotated, against the action of said spring, of means adapted to be operated while the machine is running to vary the tension of the spring, and means adapted to automatically lock the tension of said spring at any desired point.

4. The combination with a shaft, a loose pulley mounted on said shaft, a support revoluble with said shaft, levers carried by said support, clutch-bearings carried by said levers and adapted to engage said pulley, and weights on said levers tending by centrifugal force when said shaft is rotated to effect a disengagement between said clutch-bearings and said pulley, of a sliding collar carried by said shaft and bearing upon said levers, a second sliding collar carried by said shaft, a spring bearing against said collars and tending normally, until a predetermined speed of rotation is reached, to force said clutch-bearings into engagement with said pulley, means for sliding said second collar to vary the tension of said spring and means adapted as said collar is moved to automatically lock it in any desired position.

5. The combination with a shaft, a loose pulley mounted on said shaft, a sleeve secured to said shaft and carrying a support, levers carried by said sleeve, clutch-bearings on said levers adapted to engage said pulley, weights on said levers tending by centrifugal force, when said shaft is rotated, to disengage said clutch-bearings from said pulley, of a collar slidingly mounted on said sleeve and bearing against said levers, a second collar slidingly mounted on said sleeve, a spring bearing against said collars and adapted to normally force said clutch-bearings into engagement with said pulley until a predetermined speed of rotation is reached, mechanism adapted to slide said second collar on said shaft to vary the pressure of the spring between said two collars, and means for locking said second collar in any desired position.

6. The combination with a shaft, a loose pulley mounted on said shaft, a sleeve secured to said shaft and carrying a support, levers carried by said sleeve, clutch-bearings on said levers adapted to engage said pulley, and weights on said levers tending by centrifugal force, when said shaft is rotated, to disengage said clutch-bearings from said pulley, of a collar slidingly mounted on said sleeve and bearing against said levers, a second collar slidingly mounted on said sleeve, a spring bearing against said collars and adapted to normally force said clutch-bearings into engagement with said pulley until a predetermined speed of rotation is reached, a lever engaging said second collar and adapted by its operation to slide said collar to and fro upon said shaft, a ratchet on said sleeve, spring-seated pins carried by said second collar and adapted to engage said ratchet, and means for disengaging said pins from said ratchet.

7. The combination with a shaft, a loose pulley mounted on said shaft, a sleeve secured to said shaft and carrying a support, levers carried by said sleeve, clutch-bearings on said levers adapted to engage said pulley, and weights on said levers tending by centrifugal force, when said shaft is rotated, to disengage said clutch-bearings from said pulley, of a collar slidingly mounted on said sleeve and bearing against said levers, a second collar slidingly mounted on said sleeve, a spring bearing against said collars and adapted to normally force said clutch-bearings into engagement with said pulley until a predetermined speed of rotation is reached, a lever engaging said second collar and adapted by its operation to slide said collar to and fro upon said shaft, a ratchet on said sleeve, spring-seated pins carried by said second collar and adapted to engage said ratchet, a third collar slidingly mounted on said sleeve and adapted when forced against the inner ends of said pins to force them out of engagement with said ratchet, and a lever adapted to operate said third collar.

GEORGE F. LEIGER.

Witnesses:
MINNIE A. HUNTER,
CHARLES E. PICKARD.